United States Patent [19]

Nakata et al.

[11] Patent Number: 5,481,448

[45] Date of Patent: Jan. 2, 1996

[54] MULTILEVEL INVERTER HAVING VOLTAGE DIVIDING CAPACITORS DISTRIBUTED ACROSS MULTIPLE ARMS

[75] Inventors: Kiyoshi Nakata, Nishiibaraki; Kiyoshi Nakamura, Katsuta; Tokunosuke Tanamachi, Katsuta; Yoshio Tsutsui, Katsuta; Mutsuhiro Terunuma, Mito, all of Japan

[73] Assignee: Hitachi, Ltd., Tokyo, Japan

[21] Appl. No.: 329,374

[22] Filed: Oct. 25, 1994

Related U.S. Application Data

[63] Continuation of Ser. No. 44,493, Apr. 9, 1993, abandoned, which is a continuation of Ser. No. 760,069, Sep. 13, 1991, abandoned.

[30] Foreign Application Priority Data

Sep. 14, 1990 [JP] Japan ................................. 2-242370

[51] Int. Cl.⁶ ................................................. H02M 7/521
[52] U.S. Cl. ............................................. 363/137; 363/41
[58] Field of Search ............................. 318/311; 363/37, 363/41, 42, 43, 132, 137; H02M 7/48, 7/515, 7/537, 7/757

[56] References Cited

U.S. PATENT DOCUMENTS

| | | | |
|---|---|---|---|
| 4,135,235 | 1/1979 | Baker | 363/43 |
| 4,344,123 | 8/1982 | Bhagwat et al. | 363/43 |
| 4,564,895 | 1/1986 | Glennon | 363/41 |
| 4,635,177 | 1/1987 | Shekkawat et al. | 363/41 |
| 4,639,849 | 1/1987 | Noworolski et al. | 363/132 |
| 4,733,146 | 3/1988 | Hamby | 363/137 |
| 4,978,894 | 12/1990 | Takahara | 363/41 |
| 5,155,675 | 10/1992 | Maruyama et al. | 363/98 |

FOREIGN PATENT DOCUMENTS

| | | |
|---|---|---|
| 0250719 | 3/1987 | European Pat. Off. . |
| 0299339 | 7/1988 | European Pat. Off. . |
| 0321865 | 12/1988 | European Pat. Off. . |
| 56-115182 | 2/1980 | Japan . |
| 57-177284 | 10/1982 | Japan .................... H02M 7/537 |
| 63-502953 | 10/1988 | Japan .................... H02M 7/48 |
| 64-034182 | 2/1989 | Japan .................... H02M 7/515 |
| 1-198280 | 8/1989 | Japan .................... H02M 7/515 |

OTHER PUBLICATIONS

J. K. Steinke: "Grundlagen fur die Entwincklung eines Steuerverfahrens fur GTO–Dreipunktwechsel–richter fur Trakionsantriebe", *ETZ–Archiv*, Oct. 1988, 10, pp. 215–220.

Nabae et al., "A New Neutral–Point–Clamped PWM Inverter," Conf. IAS Annual Mtg. Oct. 1980, Cincinnati Ohio USA, pp. 761–766.

*Primary Examiner*—Jeffrey L. Sterrett
*Attorney, Agent, or Firm*—Antonelli, Terry, Stout & Kraus

[57] ABSTRACT

The power converter of the invention relates to a small-sized highly efficient power converter for generating an a.c. voltage output of multiple levels with less harmonic content. In the power converter, a d.c. voltage source is separated into plural sections by series connected voltage dividing capacitors and multiple levels of a.c. output voltage are obtained from the divided d.c. voltage by on-off control of switching devices. The power converter has plural sets of the voltage dividing capacitors disposed separately adjacent to each switching devices, and series connection point of each set of the voltage dividing capacitors are connected to division points of the corresponding switching devices of each phase. The voltage dividing capacitors are connected with each other at their series connection points. Thereby, the arrangement makes wiring length short and equal between the switching devices and the voltage dividing capacitors for each phase and reduce a loss in the snubber circuit, resulting in an a.c. voltage output with less harmonic content.

16 Claims, 9 Drawing Sheets

MULTILEVEL INVERTER HAVING VOLTAGE DIVIDING CAPACITORS DISTRIBUTED ACROSS MULTIPLE ARMS

This application is a continuation application of Ser. No. 08/044,493, filed Apr. 9, 1993, now abandoned, which is a continuation application of Ser. No. 07/760,069, filed Sep. 13, 1991, now abandoned.

BACKGROUND OF THE INVENTION

1. Field of the Invention

The present invention related to improvement of a power converter for converting a direct current to an alternating current or an alternating current to a direct current, and in particular to a construction technology suitable for size reduction of a power converter.

2. Description of the Related Art

Hitherto, an inverter referred to as a 3-level inverter is known as a kind of converter. Besides the high-potential point and low-potential point, a d.c. voltage source used for this 3-level inverter has an intermediate-potential point between the high-potential point and the low-potential point. This type of inverter is configured to select one potential level from three levels of potential at the high-potential point, low-potential point and intermediate-potential point by turning on and off of included switching devices, and to provide the selected potential at an a.c. terminal. Therefore, the 3-level inverter may raise the PWM switching frequency apparently, and then provide a.c. output with less harmonic content.

This type of 3-level inverter is disclosed in (1) JP-B-51-47848, (2) JP-B-53-14744, (3) JP-A-56-74088, (4) JP-A-56-115182, (5) JP-A-56-121374, (6) JP-A-57-177284, (7) JP-A-63-502953, (8) JP-A-64-34182, and (9) JP-A-1-198280, for example.

Inverters having relatively large capacities such as variable voltage variable frequency (VVVF) inverters are often arranged with switching arms for each phase in a linear arrangement relation.

In the above described conventional converter apparatus, however, wiring lengths from voltage dividing capacitors to switching devices of respective phases are long and unequal. The wiring inductance may cause excessive voltages in snubber circuits of respective switching devices or a certain device, resulting in problems of excessive voltage in snubber circuit of the switching devices, increase of snubber loss, and requirement of size increase in snubber circuits. Especially in large-capacity apparatuses, therefore, it is keenly demanded to make wiring short and uniform to the utmost.

An arrangement of d.c. filter capacitors is disclosed in JP-A-57-206279. The arrangement is a three-phase full-bridge inverter comprising switching devices in six arms, wherein a d.c. filter capacitor is disposed for each phase, thereby the wiring length is shortened between the d.c. filter capacitor and switching device of each phase to the utmost, resulting in reducing loss in the snubber circuits and in obtaining small size of the apparatus.

However, this prior art relates to a so-called 2-level inverter having only two levels in output phase voltage as the same levels as at the high-potential point and the low-potential point of the d.c. power source. And the capacitors thereof separately disposed for respective phases are used only for filtration.

SUMMARY OF THE INVENTION

It is an object of the present invention to provide a small-sized highly efficient power converter for generating multiple levels of a.c. output voltage wherein the d.c. voltage source is separated into a plurality of sections by series connected capacitors and multiple levels of a.c. output voltage are obtained from the d.c. voltage source by on-off control of switching devices.

It is another object of the present invention to provide a power converter generating a.c. voltage output with less harmonics.

A power converter in accordance with the present invention has plural sets of series connected voltage dividing capacitors disposed separately at the d.c. supply side of the converter, and serial connection points of the voltage dividing capacitors are connected to division points of switching devices of respective phases.

Further, a power converter in accordance with a second aspect of the present invention has voltage dividing capacitors disposed at the d.c. supply side and connected with each other at their serial connection points.

Since the length of wiring between the switching devices and the corresponding voltage dividing capacitors of each phase can be set so short owing to divisional disposition of the voltage dividing capacitors at the d.c. supply side, overcharge voltage of the snubber circuit induced by inductance of the wiring when a switching device turns off may be limited to a small value. Therefore, it is possible to reduce a loss in the snubber circuit, resultingly a small-sized power converter.

Further, owing to mutual connection of serial connection points of respective voltage dividing capacitors, induced harmonics caused by switching of the switching devices can be cancelled with harmonics of other phases, resulting in obtaining a capacitor voltage with a restricted pulsating voltage component. As a result, it is possible to further reduce the size because the resisting voltage of the devices may be limited to a low voltage, and it is also possible to reduce harmonics contained in the a.c. output.

DESCRIPTION OF THE PREFERRED EMBODIMENTS

Reference will now be made in detail to the present preferred embodiments of the invention, examples of which are illustrated in the accompanying drawings.

Figure 1:
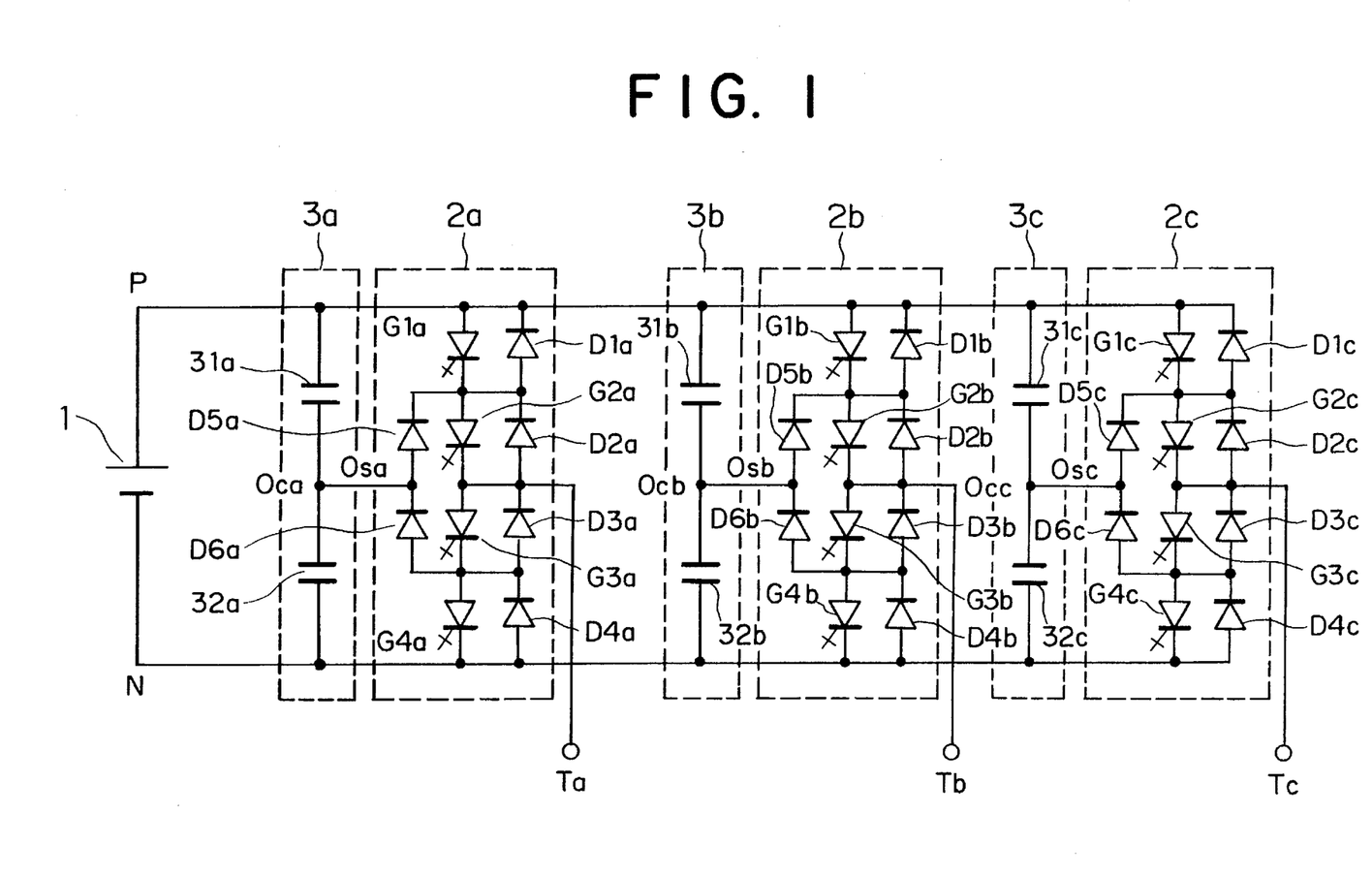
FIG. 1 shows a wiring diagram of a three-phase power converter of the invention.

The first example shown in FIG. 1 is an inverter having a bisected d.c. source and outputting three-phase a.c. voltage altering among three potential levels.

Referring to FIG. 1, numeral 1 denotes a d.c. voltage source such as a d.c. power source or an armature of a d.c. motor, and 2a, 2b and 2c denote a 3-level switching arm of phases a, b and c, respectively. Speaking of phase a, the arm of phase a comprises a group of switching devices G1a through G4a having a self-extinguishable function, rectifying devices D1a through D4a and auxiliary rectifying devices D5a through D6a, and the arm outputs a.c. voltage to a terminal Ta. The arms of the phases b and c also have the similar configuration. 3a, 3b and 3c respectively denote a voltage dividing capacitor dividing voltage at its intermediate point. Respective serial connection points (intermediate potential points) Oca, Ocb and Occ of the capacitors are connected to corresponding connection points Osa, Osb and Osc between auxiliary rectifying devices D5a and D6a, D5b and D6b, and D5c and D6c, which correspond dividing points or intermediate potential input points of the switching device groups.

P denotes a high-potential point, and N denotes a low-potential point of the d.c. voltage source.

Where Ed1 and Ed2 are the voltages across capacitors 31a and 32a of the phase a respectively, an a.c. output ea with 3-level voltage altering between the potential Ed1 at the high-potential point, the potential O at the intermediate point and the potential −Ed2 at the low-potential point can be led to the output terminal Ta by exercising on-off control upon the switching devices G1a through G4a as shown in the table 1 indicated below. Spa, Soa, Sna and Sa denote switching functions indicative of conduction states of respective switching devices by numerals 1, 0, and −1. When Ed1=Ed/2, the output voltage ea can be expressed by the following equation:

$$ea = SpaEd1 - SnaEd2 = SaEd/2.$$

The waveform of the output voltage ea is formed by combining pulse voltages having magnitude Ed/2 (high potential), 0 (intermediate potential), and −Ed/2 (low potential) respectively. In general, Sa is subjected to pulse width modulation (PWM) control so that ea approaches to a sine wave.

TABLE 1

| Switching state | | | | Switching function | | | | Output voltage |
|---|---|---|---|---|---|---|---|---|
| G1a | G2a | G3a | G4a | Spa | Soa | Sna | Sa | ea |
| On | On | Off | Off | 1 | 0 | 0 | 1 | Ed1 |
| Off | On | On | Off | 0 | 1 | 0 | 0 | 0 |
| Off | Off | On | On | 0 | 0 | 1 | −1 | −Ed2 |

In the converter of the embodiment, the voltage dividing capacitors are disposed at the d.c. input side individually for each phase. Therefore, these capacitors can be disposed near the group of switching devices, and the wiring length can be made short to the utmost. As a result, wiring inductance between voltage dividing capacitors and switching devices can be made small. Consequently, it becomes possible to restrict the resisting voltage of the switching devices and to reduce the size of snubber circuits (not illustrated in FIG. 1).

The power converter described above relates to a converter having three phases. It is a matter of course that similar effects are obtained even in multiple phases of two or more than three phases.

Figure 2:
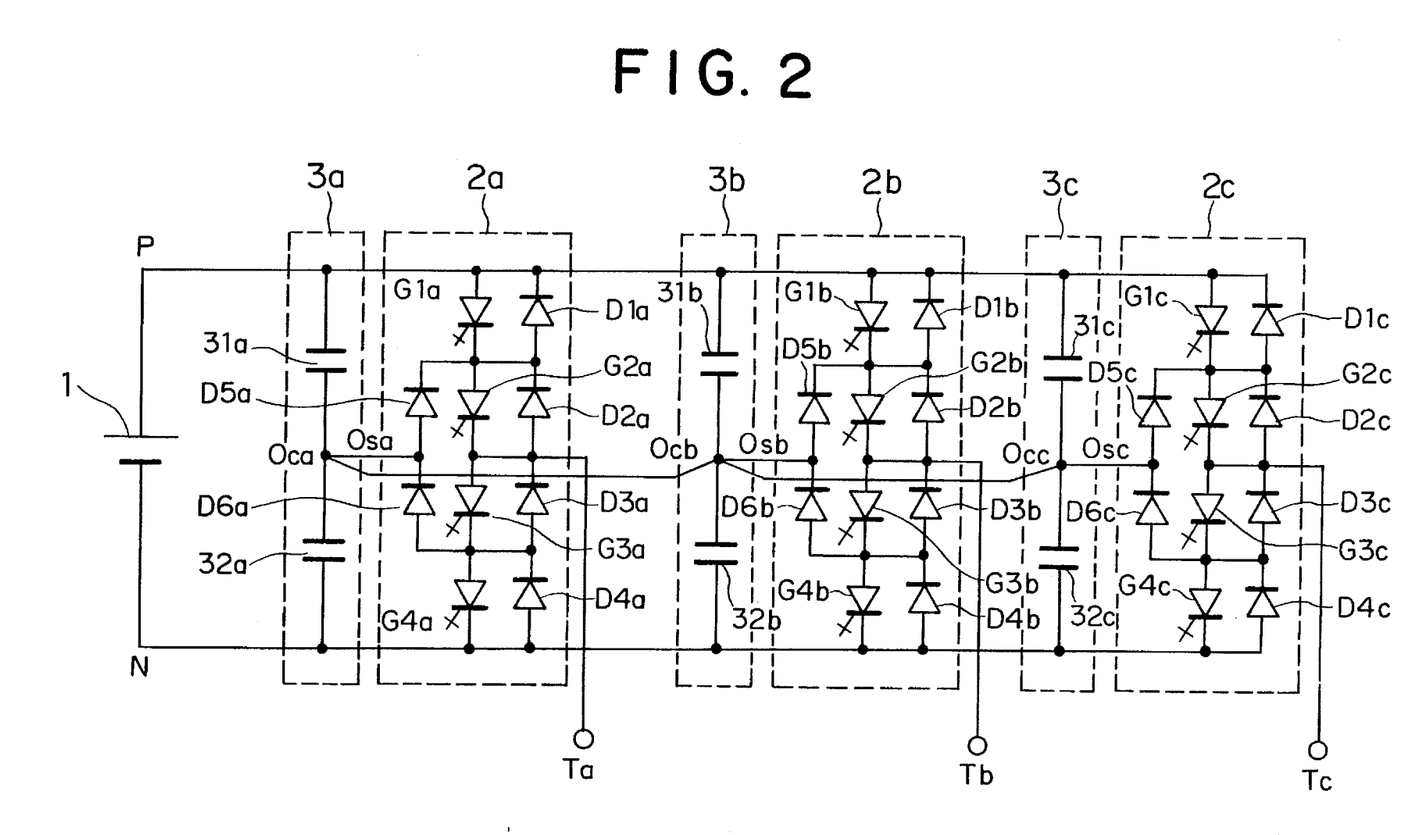
FIG. 2 shows a wiring diagram of another three-phase power converter of the present invention.

FIG. 2 shows another embodiment of the present invention. Excepting that connection points Oca, Ocb and Occ of voltage dividing capacitors associated with respective phases are connected to each other, the power converter shown in FIG. 2 is the same as in FIG. 1. Circuit operations of the case where connection points of voltage dividing capacitors are connected to each other will be discussed comparing to the case where the connection points are not connected.

Considering the case where the connection points are not connected, the following relation is obtained:

$$Ed = \frac{1}{Ct} \int (is - isp - io/2)dt \qquad (2)$$

where term Ed represents output voltage of the d.c. voltage source, term is current supplied from the d.c. voltage source, term C capacitance of an individual voltage dividing capacitor of each phase, Ct is a total capacitance combined with all of the voltage dividing capacitors (=3C/2), isp is a sum total of currents ispa, ispb and ispc, and io is a sum total of currents ioa, iob and ioc, and where currents ispa, ispb and ispc flow through the self-distinguishable switching devices, G1a, G1b and G1c, respectively, and currents ioa, iob and ioc flow into connection points Oca, Ocb and Occ of voltage dividing capacitors, respectively.

A current icpa flowing into the upper capacitor of the voltage dividing capacitors of the phase a is expressed by the following equation:

$$i\,cpa=(is-isp=io/2)/3+ioa/2 \qquad (3)$$

Therefore, voltage vcpa of the upper voltage dividing capacitor of the phase a is described by the following equation:

$$vcpa = \frac{1}{2}Ed + \frac{1}{2C}\int ioadt \qquad (4)$$

As evident from this equation, pulsation is caused in vcpa by ioa. In case PWM control is so exercised that the output voltage may become a sine wave, the current ioa may contain a large amount of the main component of the inverter output frequency (fundamental wave component) and the third order harmonic component, and hence the voltage at connection points of voltage dividing capacitors pulsates with these frequencies.

On the other hand, in case where the intermediate points of voltage dividing capacitors of respective phases are connected to each other, the voltage vcpa of the upper voltage dividing capacitor of phase a can be expressed by the following equation:

$$vcpa = \frac{1}{2} Ed + \frac{1}{2C} \int (io/3) dt \qquad (5)$$

In this case, the voltage vcpa depends upon the current io. Since io is the sum total of the currents ioa, iob and ioc flowing into intermediate points between voltage dividing capacitors, io does not contain other components than zero-phase-sequence currents of ioa, iob and ioc. Therefore, pulsation due to the fundamental component is removed.

The converter described in FIG. 2 has an additional effect of being applied with a stable voltage across voltage dividing capacitors as heretofore described, in addition to the effects of the embodiment of FIG. 1. Therefore, the converter may advantageously lower the resisting voltage of the devices and reduce harmonic components in the a.c. output. Further, by setting the connection impedance values equal between respective intermediate-potential points, harmonics can be surely cancelled.

Figure 3:
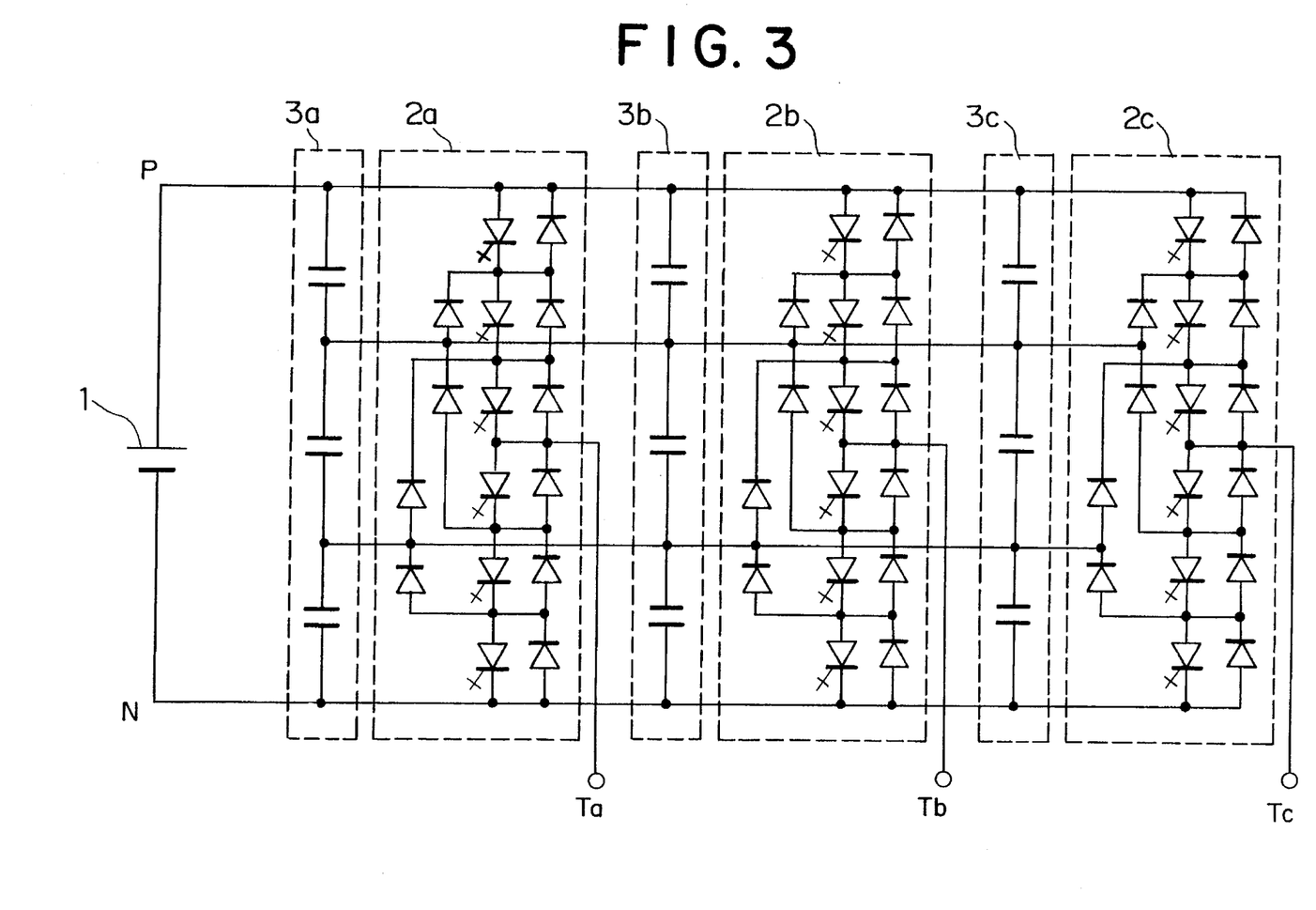
FIG. 3 shows a wiring diagram of still another three-phase power converter of the present invention.

FIG. 3 shows still another converter of the invention which is a modification of the converter of FIG. 2 by dividing the d.c. input voltage into three parts. Multi-level a.c. output voltage can be derived from stable voltages of the dividing capacitors depending on thus increased number of voltage division parts of the d.c. input voltage.

Figure 4:
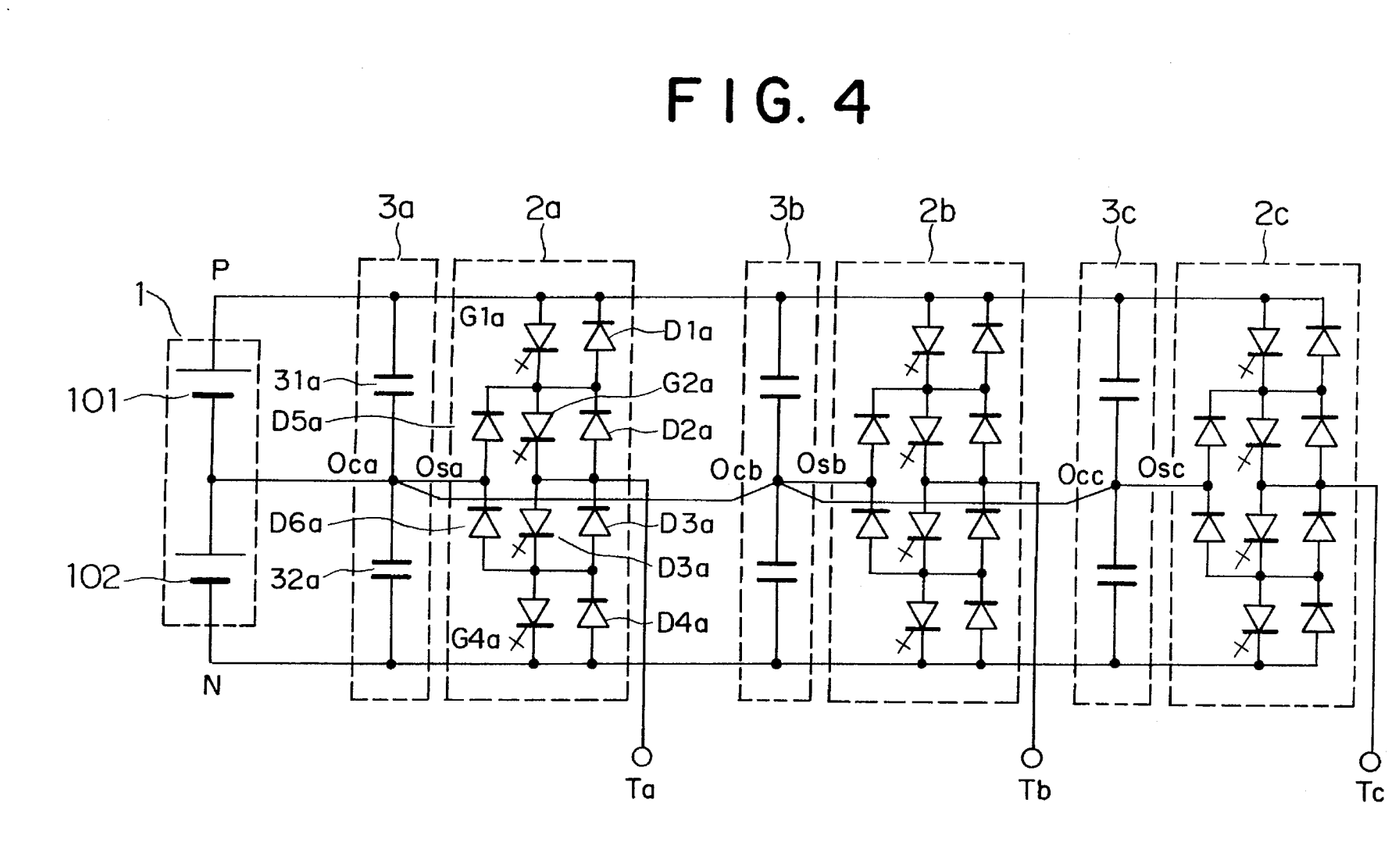
FIG. 4 shows a wiring diagram of a further three-phase power converter of the present invention.

A further power converter of the invention has plural independent d.c. voltage sources connected in series, such as individual power sources 101 and 102 included in the d.c. power source 1 as shown in FIG. 4. The power converter may surely obtain an equal voltage allotment between the upper and lower voltage dividing capacitors by connecting the connection points of these d.c. voltage sources to the connection points of voltage dividing capacitors.

Figure 5:
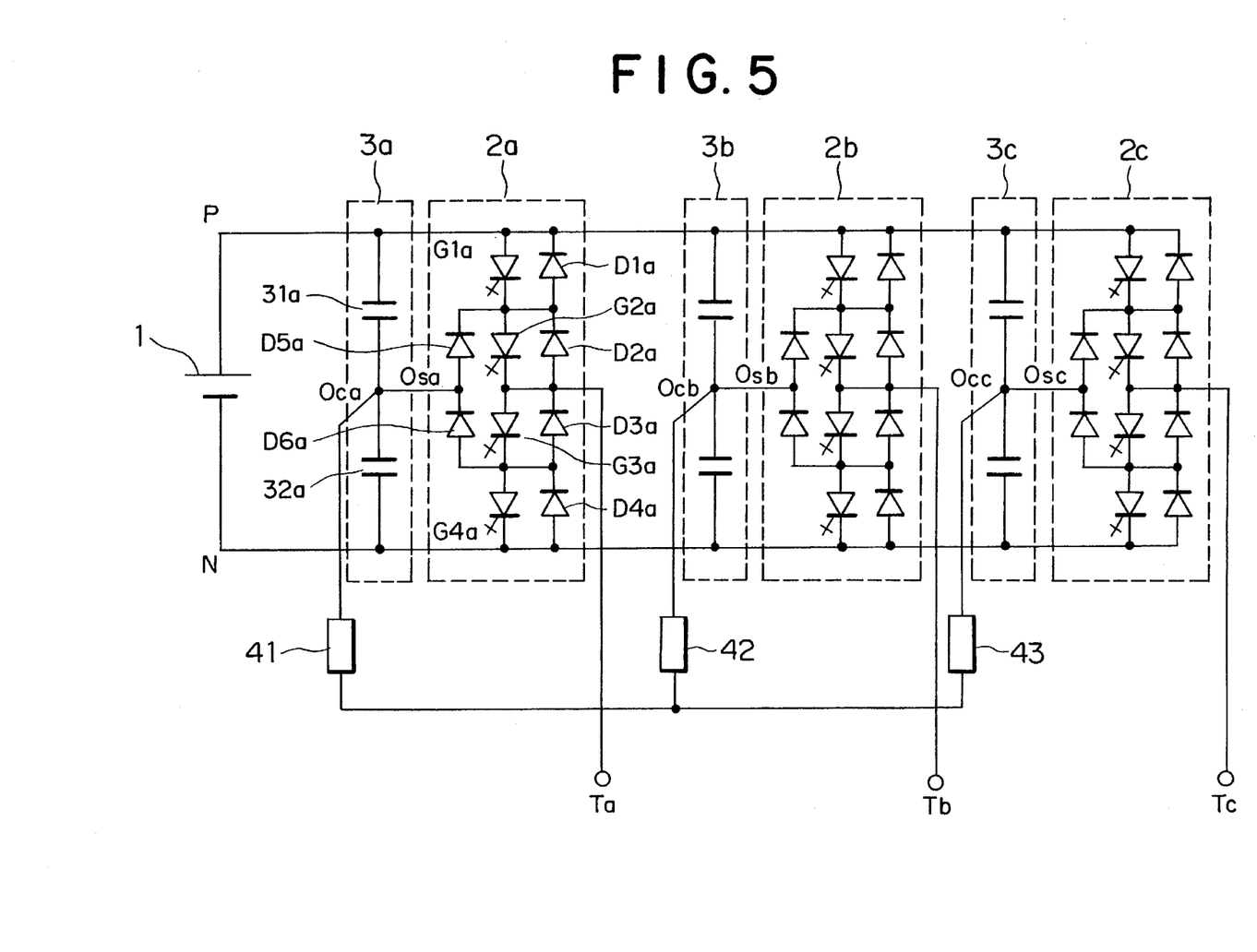
FIG. 5 shows a wiring diagram of a still further three-phase power converter of the present invention.

A still further power converter shown in FIG. 5 has impedance elements 41, 42 and 43 connected between the intermediate connection points of voltage dividing capacitors of respective phases together. The power converter may obtain more stable voltage of the dividing capacitors than that of FIG. 1. For example, if the impedance elements are capacitors with capacitance Co and coupled in star connection, the voltage vcpa of the upper voltage dividing capacitor of phase a can be expressed by the following equation:

$$vcpa = \frac{1}{2} Ed + \frac{1}{2C + Co} \int \left( ioa + \frac{Co}{6C} io \right) dt \qquad (6)$$

In this case, the fundamental wave component contained in the current flowing into the intermediate connection points of the voltage dividing capacitors is reduced by a factor of 2C/(2C+Co). Although the case where the impedance elements are coupled in star connection is described above, delta connection may be used instead.

Figure 6:
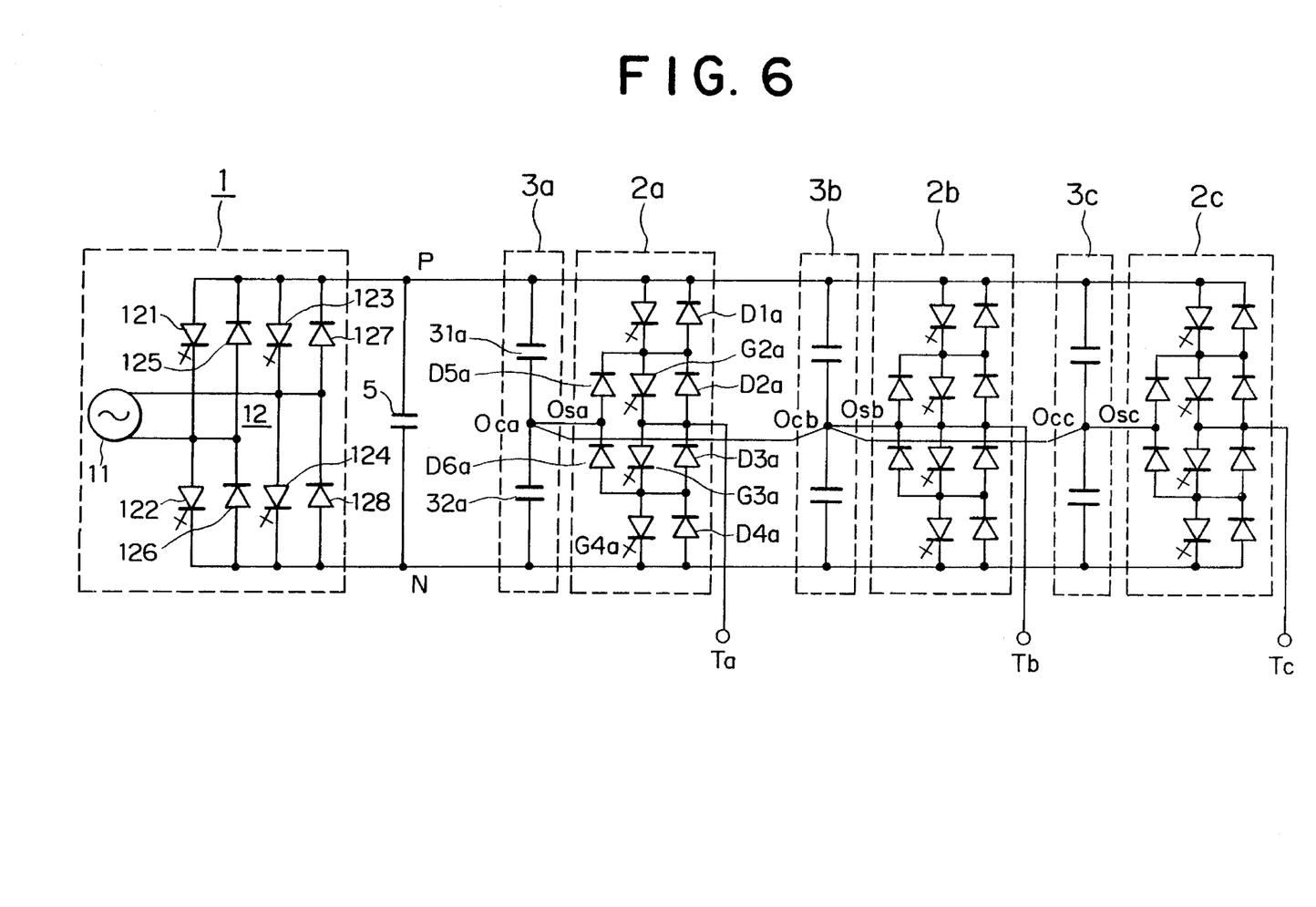
FIG. 6 shows a wiring diagram of another three-phase power converter of the present invention.

Further, in an embodiment shown in FIG. 6, a stable d.c. voltage source can be established by a filter capacitor 5 disposed in parallel on the d.c. voltage input side. This arrangement of FIG. 6 is much effective in the case where the d.c. voltage source 1 produces d.c. voltage output including harmonics, such as an a.c. power source 11 with a rectifier circuit 12. FIG. 6 roughly shows a well know PWM converter comprising GTO thyristors denoted with numerals 121–124 and diodes denoted with numerals 125–128.

Figure 7:
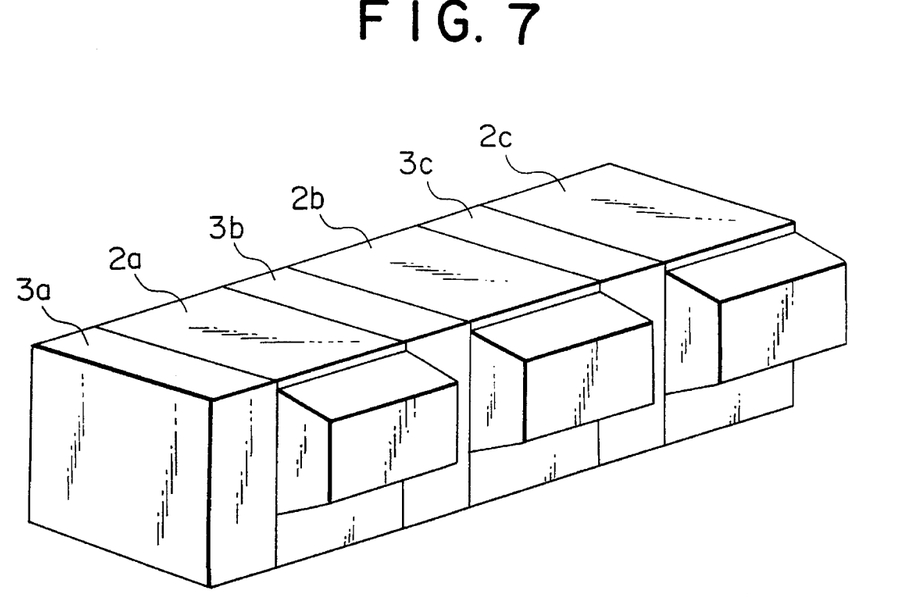
FIG. 7 is an exterior oblique view showing an example arrangement of switching arms and voltage dividing capacitors commonly used for the converters shown in FIGS. 1 to 6.

FIG. 7 is an exterior oblique view of an outfitting equipment for outfitting to a vehicle with the switching arms 2a, 2b and 2c and the voltage dividing capacitors 3a, 3b and 3c of respective phases commonly used for the embodiments of FIGS. 1 through 6.

Figure 8:
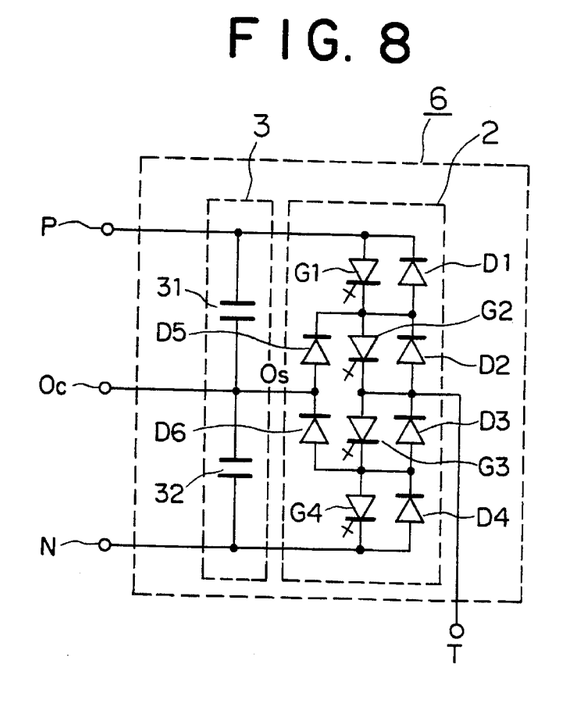
FIG. 8 is a wiring diagram of a unit inverter commonly used for the converters of FIGS. 1 to 6.

FIG. 8 shows a unit inverter (power converting device) 6 for each phase.

That is to say, configurations of unit inverters for phases a, b and c in all the embodiments described in FIGS. 1–6 are perfectly identical, inclusive of voltage dividing capacitors. Therefore, a power converter having an arbitrary number of phases can be constructed by combining mass-produced unit inverters with d.c. terminals P, N and Oc and an a.c. terminal T.

Figure 9:
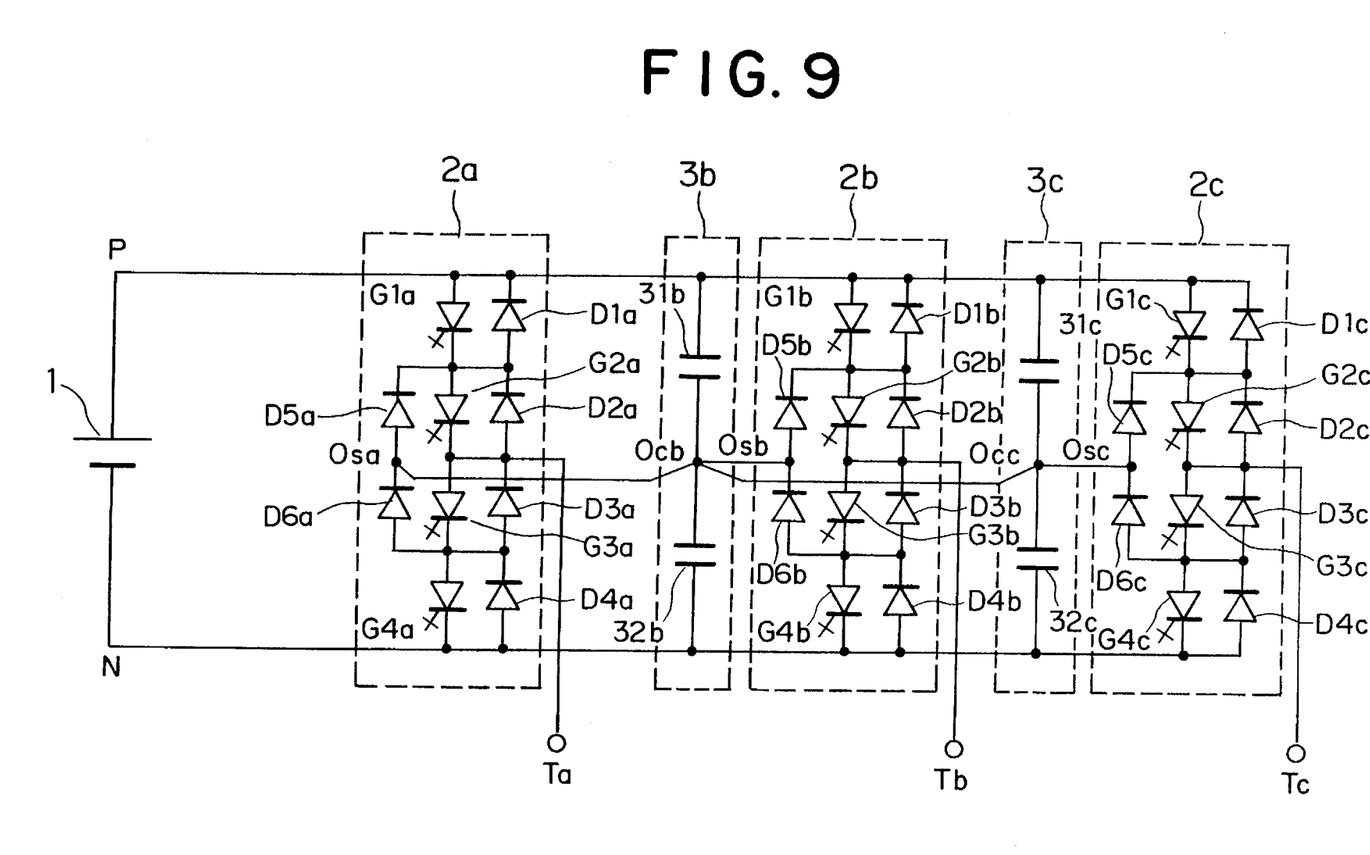
FIG. 9 shows a wiring diagram of a further three-phase power converter of the present invention.

FIG. 9 shows a further embodiment of a power converter of the present invention. Differing from the embodiment of FIG. 2, this power converter of three-phase three-level inverter is divisionally disposed with only two sets 3b and 3c of the voltage dividing capacitors. The intermediate connection points Ocb and Occ of respective voltage dividing capacitors and the intermediate voltage input points (division points of device groups) Osa, Osb and Osc of the switching arms 2a, 2b and 2c of respective phases are connected altogether.

Figure 10:
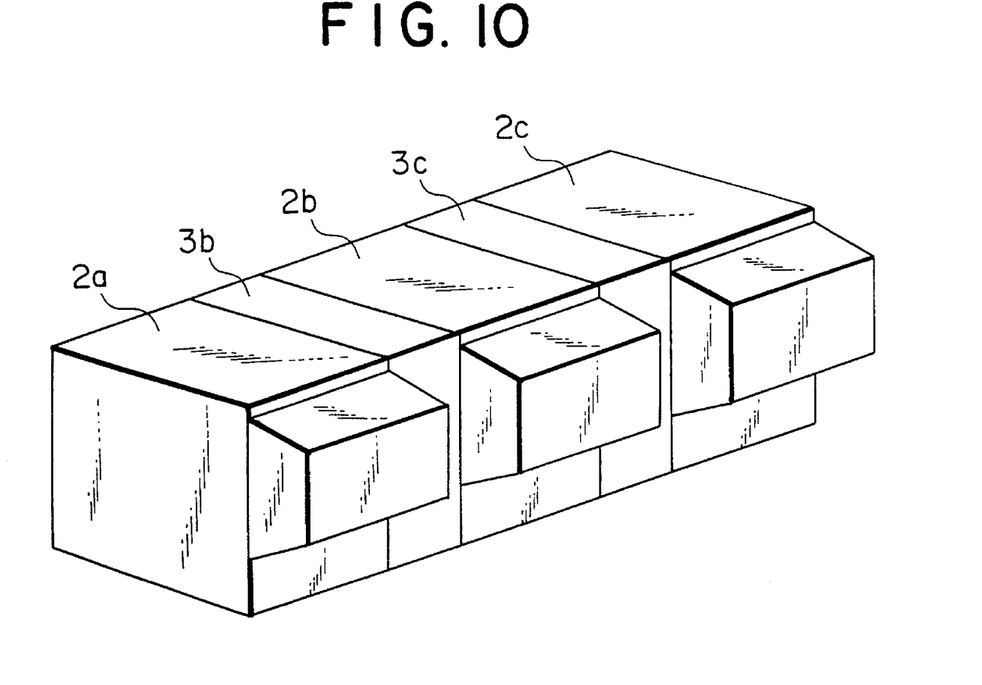
FIG. 10 is an exterior oblique view showing an example arrangement of the switching arms and the voltage dividing capacitors used for the converter shown in FIG. 9.

FIG. 10 is an exterior oblique view illustrating an outfitting equipment of the switching arms 2a, 2b and 2c and the voltage dividing capacitors 3b and 3c used for the embodiment of FIG. 9.

That is to say, the switching arms 2a, 2b and 2c of respective phases are arranged in a linear arrangement relation, and the voltage dividing capacitors 3b and 3c are divisionally disposed at two positions between the switching arm 2a and the arm 2b of two phases and between the switching arm 2b and the arm 2c, respectively.

Figure 11:
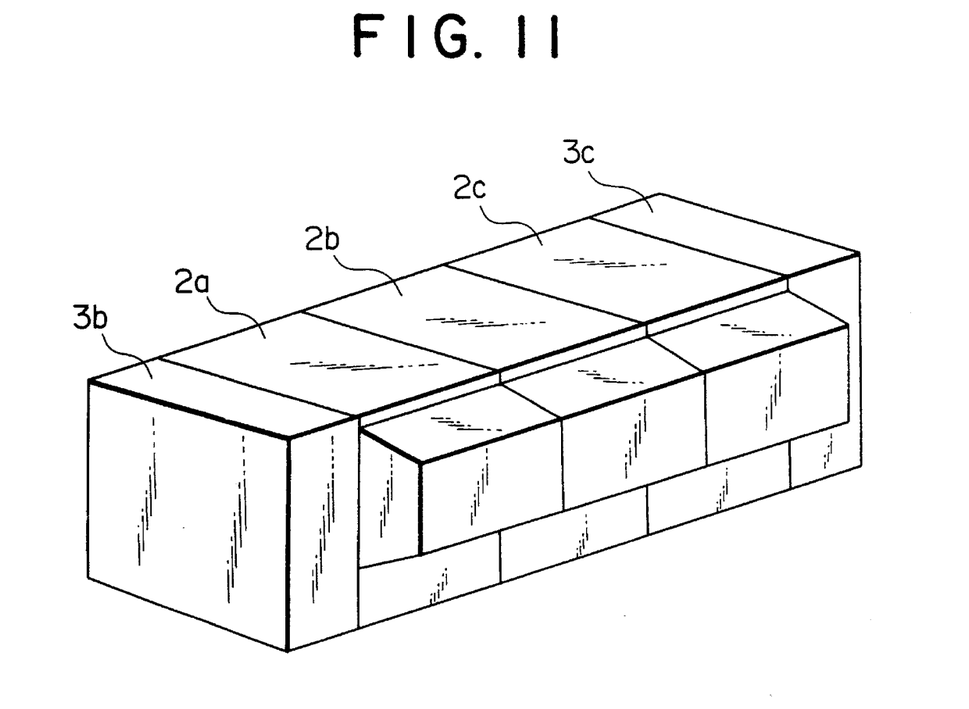
FIG. 11 is an exterior oblique view showing another example arrangement of the switching arms and the voltage dividing capacitors used for the converter shown in FIG. 9.

FIG. 11 is also an exterior oblique view illustrating another arrangement of an outfitting equipment of the switching arms 2a, 2b and 2c and the voltage dividing capacitors 3b and 3c for the embodiment of FIG. 9.

That is to say, the switching arms 2a, 2b and 2c of respective phases are arranged in a linear arrangement relation, and a bisected voltage dividing capacitors 3b and 3c are disposed at both ends thereof.

In configurations of FIGS. 10 and 11, though conditions of all switching device groups of three phases do not become perfectly identical, the effect of size reduction is superior to the prior art.

All embodiments heretofore described are related only to inverters. However, it is also possible to connect output terminals of these inverters to an a.c. power source via reactance elements and make them operate as self-excited converters for converting an alternating current to a direct current. In this case as well, similar effects to those used in inverters can be expected.

The capacitors may also be arranged at the top or bottom of the switching arms or at the front or rear if the arms according to the invention, while the capacitors 3a to 3c or 3b and 3c are described to be arranged between the switching arms 2a to 2c (FIG. 7 and 10, respectively) or arranged at the ends of the row of the arms (FIG. 11) in the embodiments described above.

The present invention may realize highly efficient power converters of rather small size for producing multi-level a.c. voltages derived from plural divided parts of input voltage from the d.c. source divided by voltage dividing capacitors. Further, the power converters may also provide a.c. outputs having reduced harmonic components.

We claim:

1. A power converter for generating an a.c. output voltage having at least three potential levels from a d.c. voltage source, the power converter comprising:

at least two capacitor sets each including at least two voltage dividing capacitors, two end points and at least one serial connection point connecting said voltage dividing capacitors, connected in series for dividing an input voltage from the d.c. voltage source into a divided d.c. voltage, said end points being connected with output terminals of the d.c. voltage source, respectively; and at least two switching arms for deriving the a.c. output voltages from the divided d.c. voltages, each of the switching arms having an intermediate input terminal receiving said divided d.c. voltage, switching devices controlling the a.c. output voltage, and an output terminal providing said a.c. output of each phase, wherein each of the capacitor sets is disposed correspondingly to each switching arm, and the at least one serial connection point of each capacitor set is connected to the intermediate input terminal of the corresponding switching arm; and pulsating component reducing means including the at least one serial connection point of each of the capacitor sets being connected to the at least one serial connection point of the other capacitor sets which has a substantially same potential, respectively so as to provide a capacitor voltage with a restricted pulsating component and reduced harmonic components in the a.c. output voltage.

2. A power converter according to claim 1, wherein each switching arms includes d.c. terminal, an a.c. terminal and plural switching device groups consisting of said switching devices, wherein the d.c. terminals are connected to a high-potential point, an intermediate-potential point and a low potential point and receive respective d.c. outputs, the switching device groups select potential from the potentials at the high-potential point, the intermediate potential point and the low-potential points by means of selective on-off control of switching device groups, and the a.c. terminal outputs the selected potential as the a.c. output.

3. A power converter according to claim 1, wherein the switching arms and two of the capacitor sets being arranged in a line, one of the capacitor sets being located at one end of the line and the other capacitor set at the other end of the line.

4. A power converter according to claim 1, wherein the d.c. voltage source is connected with at least one filter capacitor in parallel.

5. A power converter according to claim 1, wherein the d.c. voltage source is divided at at least one division point into the same number of d.c. voltage sources as divided by the voltage dividing capacitors, and each division point of the voltage source is connected to the corresponding at least one serial connection point between the voltage dividing capacitors of each phase.

6. A power converter according to claim 1, wherein said a.c. output voltage has three potential levels.

7. A power converter according to claim 1, wherein each switching arm includes four switching elements connected in series and rectifying devices connected in parallel to the d.c. voltage source, and having a middle connection point dividing said four switching elements to upper two elements and lower two elements and an upper connection point between the upper two elements and a lower connection point between the lower two elements, said rectifying devices connecting the upper and lower connection points to the serial connection point of a capacitor set; and an a.c. output terminal connected to the middle connection point of a switching arm.

8. A power converter according to claim 1, wherein each of said at least one serial connection point of each of the capacitor sets is connected to the at least one serial connection point of the other capacitor sets which has a substantially same potential, respectively.

9. A power converter for generating an a.c. output voltage having at least three potential levels from a d.c. voltage source, the power converter comprising:

at least two capacitor sets each including at least two voltage dividing capacitors, two end points and at least one serial connection point connecting said voltage dividing capacitors, connected in series for dividing an input voltage from the d.c. voltage source into a divided a.c. voltage, said end points being connected with output terminals of the d.c. voltage source, respectively; and at least two switching arms for deriving the a.c. output voltages from the divided d.c. voltages, each of the switching arms having an intermediate input terminal receiving said divided d.c. voltage, switching devices controlling the a.c. output voltage, and an output terminal providing said a.c. output of each phase, wherein each of the capacitor sets is disposed correspondingly to each switching arm, and the at least one serial connection point of each capacitor set is connected to the intermediate input terminal of the corresponding switching arm;

wherein the at least one serial connection point of each of the capacitor sets is connected to the at least one serial connection point of the other capacitor sets which has a substantially same potential, respectively; and wherein the at least one serial connection point of the capacitor sets of the respective phases are connected with each other via impedance elements.

10. A power converter having a plurality of phases comprising:

a d.c. voltage source having a high-potential point providing a high-potential output and a low-potential point providing a low-potential output;

a plurality of capacitor sets of at least one less than the number of the phases including plural voltage dividing capacitors, each of said capacitor set having an intermediate-potential point, receiving said high-potential output and said low-potential output, and providing an intermediate-potential output between the high-potential output and the low-potential output through said intermediate-potential point; and the same number of switching arms as the number of the phases, each of the switching arms being disposed for each phase and having d.c. terminals, an a.c. terminal and switching device groups consisting of switching devices, wherein the d.c. terminals are connected to the high-potential point, the intermediate-potential point and the low-potential point, the switching device groups select potential from the potentials at the high-potential point, the intermediate-potential point and the low-potential point by means of selective on-off control of switching devices, and the a.c. terminal outputs the selected potential, restricted pulsating component means including one of said intermediate-potential points of one capacitor set being connected with another intermediate-potential point of another capacitor set so as to provide a capacitor voltage with a restricted pulsating component and reduced harmonic components in the a.c. output; and the switching arms and the capacitor sets being arranged in line, and each of the capacitor sets being disposed between two of the switching arms, whereby a distance between each of the capacitor sets and the corresponding switching arm is substantially identical.

11. A power converter for generating an a.c. output voltage having at least three potential levels from a d.c. voltage source, said power converter comprising:

a voltage dividing capacitor means including at least two capacitors connected in series for dividing a d.c. voltage supplied from said d.c. voltage source;

at least three switching arms, one for each of at least three phases, receiving d.c. voltages from said voltage dividing capacitor means for deriving a.c. output voltages having at least three potential levels;

said voltage dividing capacitor means being provided for each of said at least three switching arms and intermediate connection points between said at least two capacitors of said voltage dividing capacitor means being connected with each other.

12. The power converter according to claim 11, wherein the d.c. voltage source is connected with at least one filter capacitor in parallel.

13. The power converter according to claim 11, wherein the d.c. voltage source is comprised of the same number of d.c. voltage sources as the number of capacitors included in one of said voltage dividing capacitor means, and a division point of the voltage sources is connected to the intermediate connection points of said voltage dividing capacitor means.

14. The power converter according to claim 11, wherein each of said switching arms comprises four switching device elements connected in series and being connected in parallel to the d.c. voltage source, a connection point of an upper two switching device elements, and a connection point of a lower two switching device elements being connected in series with rectifying device means, respectively.

15. The power converter according to claim 11, wherein said switching arms are arranged in a line, and said voltage dividing capacitor means are sandwiched between said switching arms.

16. The power converter according to claim 11, wherein the intermediate connection points of said voltage dividing capacitor means are connected with each other via impedance elements.

* * * * *